(12) United States Patent
Finnie et al.

(10) Patent No.: US 8,666,958 B2
(45) Date of Patent: Mar. 4, 2014

(54) APPROACHES TO REDUCING LOCK COMMUNICATIONS IN A SHARED DISK DATABASE

(75) Inventors: James L. Finnie, Toronto (CA); Ronen Grosman, Thornhill (CA); Matthew A. Huras, Ajax (CA); Keriley K. Romanufa, Scarborough (CA); Aamer Sachedina, Queensville (CA); Garret F. Swart, Palo Alto, CA (US); Xun Xue, Markham (CA); Roger L. Q. Zheng, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 12/626,714

(22) Filed: Nov. 27, 2009

(65) Prior Publication Data

US 2011/0131192 A1   Jun. 2, 2011

(51) Int. Cl.
*G06F 7/00* (2006.01)

(52) U.S. Cl.
USPC .................................................. 707/704

(58) Field of Classification Search
None
See application file for complete search history.

(56) References Cited

U.S. PATENT DOCUMENTS

| | | | |
|---|---|---|---|
| 5,327,556 A * | 7/1994 | Mohan et al. | 707/695 |
| 5,551,046 A * | 8/1996 | Mohan et al. | 1/1 |
| 6,349,310 B1 * | 2/2002 | Klein et al. | 707/703 |
| 6,606,626 B1 * | 8/2003 | Ponnekanti | 1/1 |
| 6,920,454 B1 * | 7/2005 | Chan | 1/1 |
| 6,965,893 B1 * | 11/2005 | Chan et al. | 1/1 |
| 7,325,064 B2 | 1/2008 | Eshel et al. | |
| 7,447,786 B2 | 11/2008 | Loaiza et al. | |
| 7,555,481 B1 | 6/2009 | Verma et al. | |
| 7,739,385 B1 * | 6/2010 | Vinjamuri et al. | 709/226 |
| 2003/0018785 A1 | 1/2003 | Eshel et al. | |
| 2006/0212573 A1 | 9/2006 | Loaiza et al. | |
| 2008/0091680 A1 * | 4/2008 | Eshel et al. | 707/8 |
| 2009/0187545 A1 * | 7/2009 | Kaku et al. | 707/3 |

OTHER PUBLICATIONS

"Chapter 18: Database System Architectures", http://codex.cs.yale.edu/avi/db-book/db4/slide-dir/ch18.ppt.

* cited by examiner

*Primary Examiner* — Truong Vo
(74) *Attorney, Agent, or Firm* — North Shore Patents, P.C.; Michele Liu Baillie; Lesley Leonessa

(57) ABSTRACT

Lock communications in a shared disk database system is reduced by several approaches: sending a single message to a lock manager for locks required for an operation and locks that will be required in the future, the operations may include row update, row delete, large scan, and row insert; performing an operation in two executions, where in a first execution locks required for the operation is determined without performing the operation, and in a second execution a single message is sent to a lock manager for the required locks and the operation is performed; in free space searching, sending a single message to a lock manager for row and page locks before a row insert is actually performed; and granting locks in an unfair manner.

25 Claims, 6 Drawing Sheets

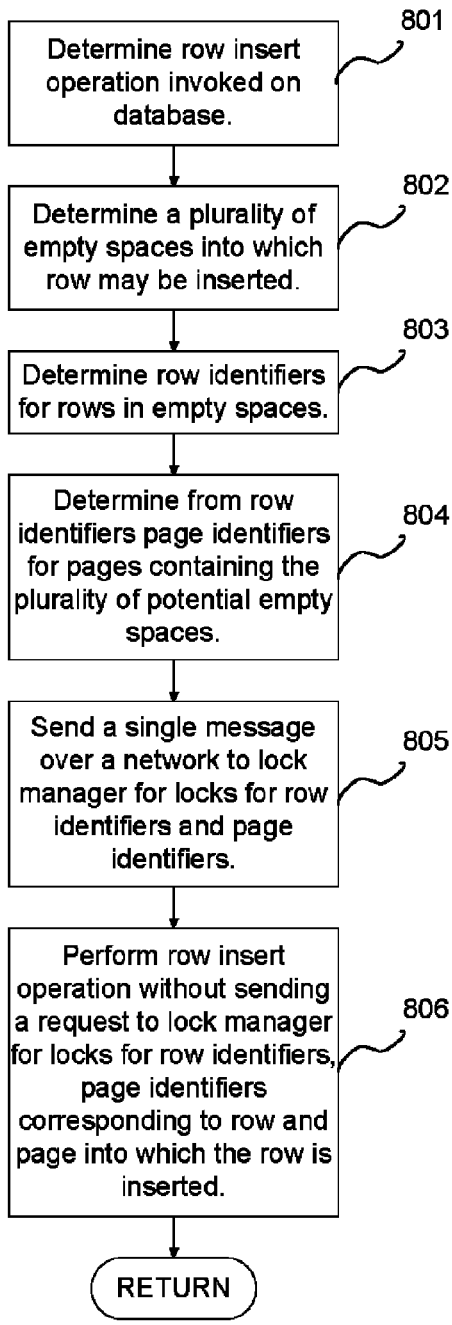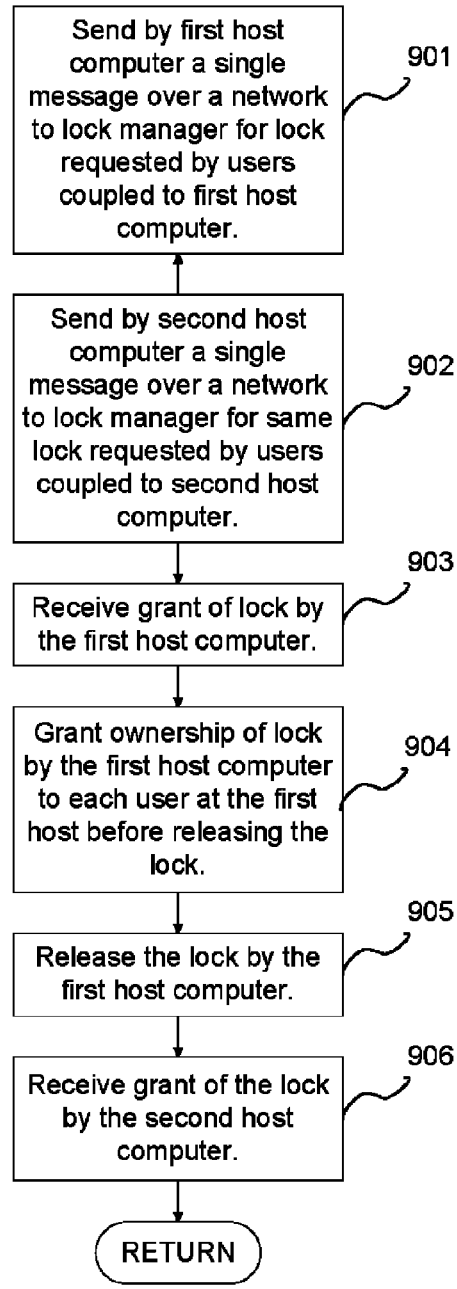
FIG. 8
FIG. 9

APPROACHES TO REDUCING LOCK COMMUNICATIONS IN A SHARED DISK DATABASE

BACKGROUND

In a shared disk database system, locks are typically owned by a central entity which either owns all of the locks or a distributed lock ownership where each member in the shared disk cluster owns a certain portion of the locks. The owning entity for a lock is responsible for giving the lock out to any cluster member requiring the lock.

The amount of communications required to obtain a lock from the lock owner can significantly impact the performance of any shared disk system. Each message requires processing and network bandwidth consumption, as well as contributing to overall system throughput. Reducing the number of messages would in turn reduce the consumption of these resources.

BRIEF SUMMARY

According to one embodiment of the present invention, lock communications in a shared disk database system is reduced by pre-fetching locks, comprising: determining an operation to modify data on the database system is invoked, the operation requiring multiple locks; determining one or more locks required for the operation and one or more locks that will be required in the future; and sending a single message over a network to a lock manager of the database system for the locks required for the operation and the locks that will be required in the future. The operation comprises a row update operation, a row delete operation, an operation requiring a large scan, and row insert operation.

In another embodiment of the present invention, lock communications in a share disk database system is reduced by performing the operation in two executions. In a first execution of the row modification operation, determining locks required for the row modification operation without performing the row modification, the first execution comprising: searching a table index for one or more row identifiers for one or more rows to be modified by the row modification operation, determining from the row identifiers one or more page identifiers for one or more pages containing the rows to be modified by the row modification operation, and determining one or more index page identifiers for one or more pages in the table index containing an index key for the rows to be modified by the row modification operation. In a second execution of the row modification operation, sending a single message over a network to a lock manager of the database system for locks for the row identifiers, the page identifiers, and the index page identifiers, and performing the row modification.

In another embodiment of the present invention, lock communications in a shared disk database system is reduced by: determining a row insert operation is invoked on the database system; determining a plurality of empty spaces in one or more tables of the database system into which a row may be inserted; determining a plurality of row identifiers for a plurality of rows in the empty spaces; determining from the plurality of row identifiers one or more page identifiers for one or more pages containing the plurality of empty spaces; sending a single message over a network to a lock manager of the database system for locks for the plurality of row identifiers and the plurality of page identifiers; and performing the row insert operation without sending a request to the lock manager for the locks for the plurality of row identifiers, the plurality of page identifiers corresponding to a slot in the empty spaces into which the row is inserted.

In another embodiment of the present invention, lock communications in a shared disk database system, the shared disk database system comprising a first host computer and a second host computer, is reduced by: sending by the first host computer a single message to a lock manager for the database system for a lock requested by a plurality of users operatively coupled to the first host computer; sending by the second host computer a single message to the lock manager for the database system for the same lock requested by one or more users operatively coupled to the second host computer; receiving by the first host computer a grant of ownership of the lock; granting by the first host computer ownership of the lock to each user operatively coupled to the first host computer who requested the lock before releasing the lock; releasing the lock by the first host computer; and receiving by the second host computer the grant of the ownership of the lock.

BRIEF DESCRIPTION OF THE SEVERAL VIEWS OF THE DRAWINGS

FIG. 8 is a flowchart illustrating an embodiment of the method for early acquisition of locks in free space searching.

FIG. 9 is a flowchart illustrating an embodiment of a method for reducing lock traffic by granting locks in an unfair manner.

DETAILED DESCRIPTION

Figure 1:
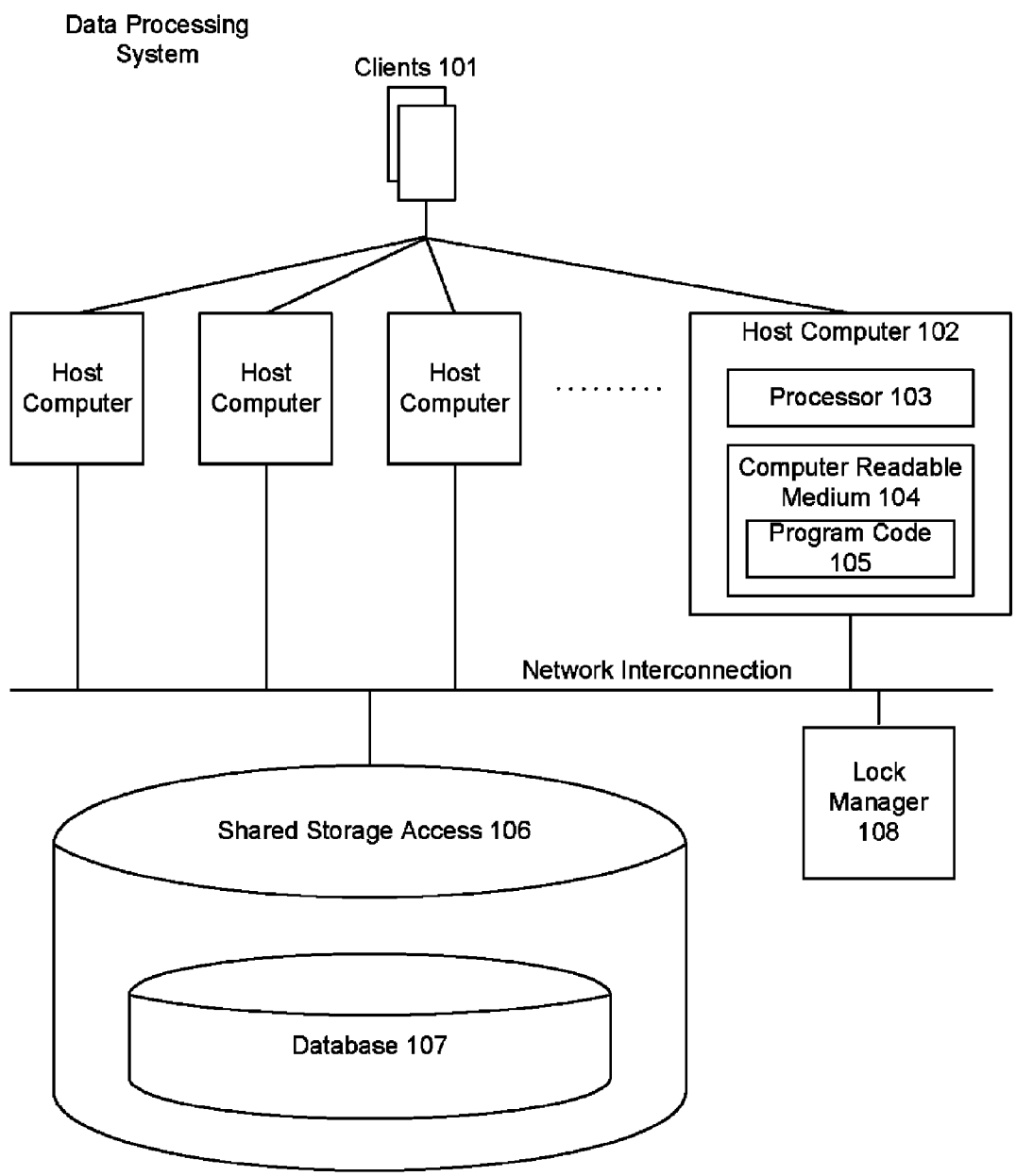
FIG. 1 illustrates an example data processing system utilizing an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an example data processing system utilizing an embodiment of the present invention. The system includes a plurality of clients 101 operatively coupled to a cluster of host computers 102. The host computers 102 co-operate with each other to provide coherent shared storage access 106 to the database 107 from any of the host computers 102. Data are stored in the database in the form of tables. Each table includes a plurality of pages, and each page includes a plurality of rows or records. The clients 101 can connect to any of the host computers 102 and see a single database. A lock manager 108 manages lock requests received over the network and releases across the host computers 102. In this embodiment, the lock manager 108 is a centralized or global lock manager.

Each host computer 102 is operationally coupled to a processor 103 and a computer readable medium 104. The computer readable medium 104 stores computer readable program code 105 for implementing the method of the present invention. The processor 103 executes the program code 105 to manage the messages sent to the lock manager 108 according to the various embodiments of the present invention.

When data in the database 107 is being modified by a host computer 102, either through an insert, update, or delete, the host computer 102 obtains a lock from the global lock manager 108 in the row(s) being modified or added and on the page(s) on which the rows are found. This locking of the rows and pages bar access by other host computers during the modification or addition to avoid data concurrency problems. To minimize the amount of locking traffic between the host computer 102 and the lock manager 108, several methods according to the present invention may be used to combine multiple lock requests into a single message or reduce the frequency with which locks are requested, as described further below. In an embodiment, the method is implemented by computer readable program code 105 (FIG. 1) executed by a processor 103 in one or more of the host computers 102.

Pre-Fetching of Locks

Figure 2:
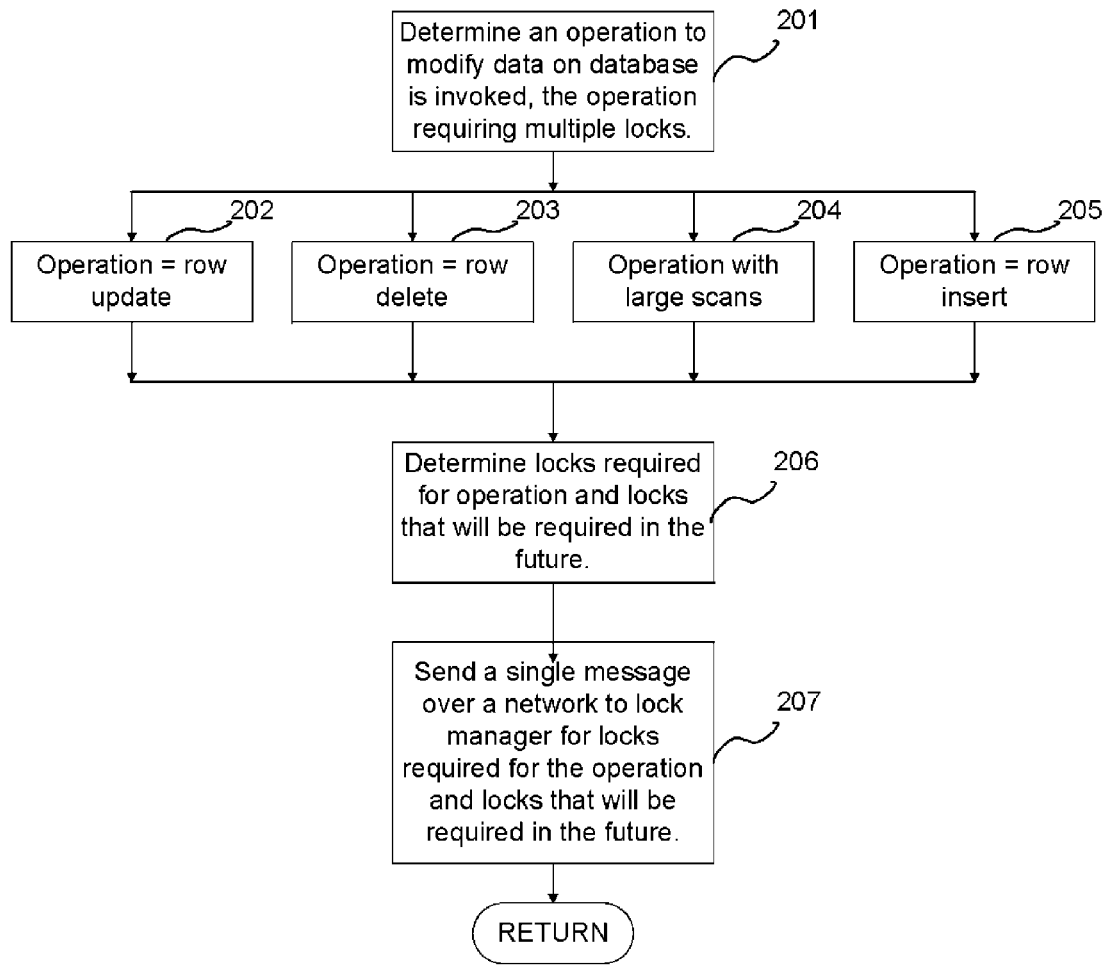
FIG. 2 is a flowchart illustrating an embodiment of a method for combining lock requests into a single message by pre-fetching locks.

In one embodiment of the method of the present invention, the number of lock requests is reduced by pre-fetching locks. FIG. 2 is a flowchart illustrating an embodiment of a method for combining lock requests into a single message by pre-fetching locks. An operation to modify data on the database 107 is determined to be invoked (201), where the operation requires multiple locks. Several operations in which locks can be pre-fetched includes: row update operations (202); row delete operations (203); large scans (204); and row insert operations (205). The locks required for the operation and locks that will be required in the future are determined (206). A single message is sent over the network to the lock manager 108 for the locks required for the operation and the locks that will be required in the future (207). These future locks are thus "pre-fetched", and a separate message to the lock manager 108 is not required when these locks become needed to perform the operation.

Pre-Fetch Locks in Row Update Operation

Updating of a row in the database 107 typically requires multiple locks for the operation. In particular, locks required include a logical lock on the row to be updated and a physical lock on the page where the row is stored. Without the method of the present invention, after locating the row to be updated, a message with a request for a lock on the row is sent to the lock manager 108. When the page where the row resides is accessed to perform the row update, another message with a request for a lock on the page is sent to the lock manager 108. Two lock request messages are thus sent.

Figure 3:
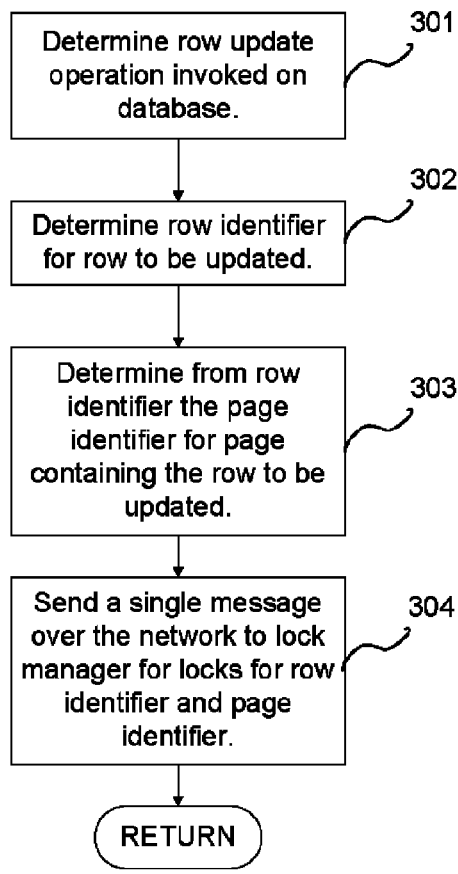
FIG. 3 is a flowchart illustrating an embodiment of a method for combining lock requests into a single message for row update operations.

With the method of the present invention, both the lock for the row and the lock for the page are requested in a single message. FIG. 3 is a flowchart illustrating an embodiment of a method for combining lock requests into a single message for row update operations. A row update operation is determined to be invoked on the database 107 (301). A row identifier for the row to be updated is determined (302). The page identifier for the page containing the row to be updated is then determined from the row identifier (303). In this embodiment, the page identifier is encoded inside the row identifier. This fact is leveraged by determining the page identifier from the row identifier. In this embodiment, whether a lock on the page will also be required can be determined from the mode of the row lock. For example, if the mode of the row lock is "shared" (i.e., read-only), then a lock on the page is not required. If the mode of the row lock is "exclusive", then a lock on the page will be required. Once both the row and page identifiers are determined, a single message is sent over the network to the lock manager 108 to request locks for the row identifier and the page identifier (304). A savings of one lock request message is realized.

Pre-Fetch Locks in Row Delete Operation

As with a row update, a row delete operation also typically requires multiple locks. In a row delete, the actual row, as well as all indexes where a key to the row is stored, must be removed. Without the method of the present invention, one message is sent to the lock manager 108 for a lock on the row, another message is sent to the lock manager 108 for a lock on the page containing the row, and a third message is sent to the lock manager 108 for a lock on the page containing the row's index key. Three lock request messages are thus sent.

Figure 4:
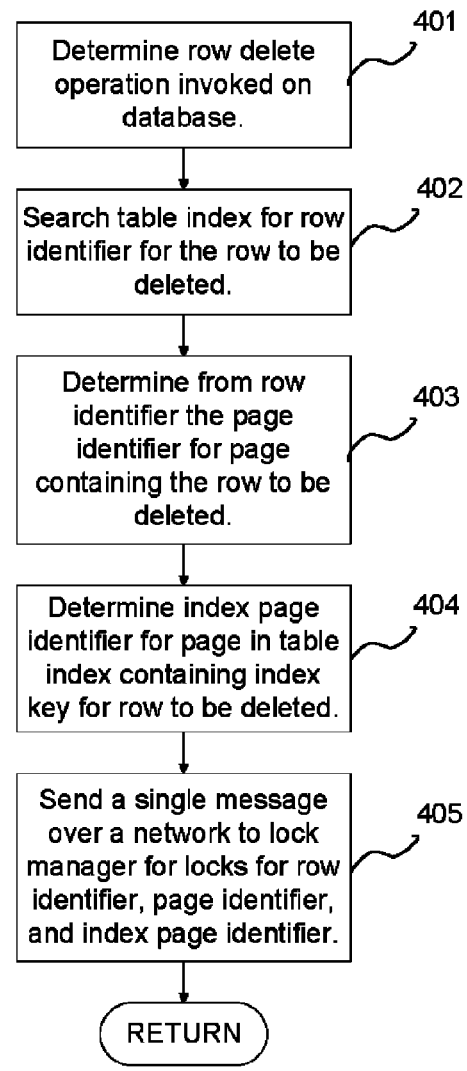
FIG. 4 is a flowchart illustrating an embodiment of a method for combining lock requests into a single message for row delete operations.

With the method of the present invention, the lock for the row, the lock for the page containing the row, and the lock for the page containing the row's index key are requested in a single message. In this embodiment, the search of a table index is leveraged for the pre-fetching of locks. FIG. 4 is a flowchart illustrating an embodiment of a method for combining lock requests into a single message for row delete operations. A row delete operation is determined to be invoked on the database 107 (401). A table index object is searched for the row identifier for the row to be deleted (402), i.e., a search for the row in the table index containing the key to the row to be deleted. From the row identifier, the page identifier for the page containing the row to be deleted is determined (403). Also determined is the index page identifier for the page in the table index containing the index key for the row to be deleted (404). A single message is then sent over the network to the lock manager 108 to request locks for the row identifier, the page identifier, and the index page identifier (405). A savings of two lock request messages is realized.

Pre-Fetch Locks in Large Scans

Figure 5:
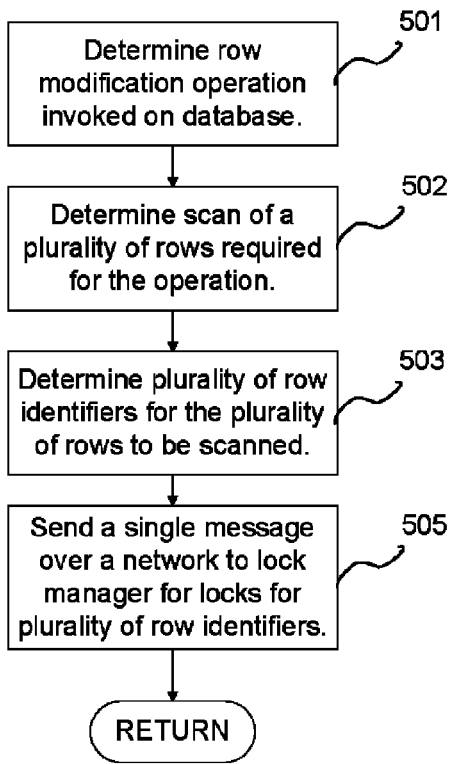
FIG. 5 is a flowchart illustrating an embodiment of a method for combining lock requests into a single message for large scans.

A row modification operation can involve large scans where multiple rows are processed. Without the method of the present invention, a row lock for each row to be scanned is requested in separate messages to the lock manager 108. With the method of the present invention, instead of locking each row individually for the scan, the lock requests for the multiple rows are combined into a single message. FIG. 5 is a flowchart illustrating an embodiment of a method for combining lock requests into a single message for large scans. A row modification operation is determined to be invoked on the database 107 (501). A scan of a plurality of rows is determined to be required for the operation (502). A plurality of row identifiers for the plurality of rows to be scanned is determined (503). A single message is then sent over the network to the lock manager 108 to request locks for the plurality of row identifiers (504). A savings of many lock request messages are realized.

The embodiment described with FIG. 5 may be combined with the pre-fetching of locks based on the mode of the row lock, described above. For example, acquiring the row lock in an exclusive mode may trigger the pre-fetching of the page lock as well, resulting in a combination of the embodiments described with FIGS. 3 and 5. However, acquiring the row lock in a shared mode for read-only may result in only combining the row lock requests, as described above with FIG. 5.

Pre-Fetch Locks in Row Insert Operation

When a row is inserted into a database by appending the row to a table, a separate append area for the table is created for each node in the form of new insert pages before the rows are actually inserted. Without the method of the present invention, row locks and page locks are acquired when the row insert operation is actually performed. Thus, separate messages are sent to the lock manager 108 for row locks and page locks required for the row insert.

Figure 6:
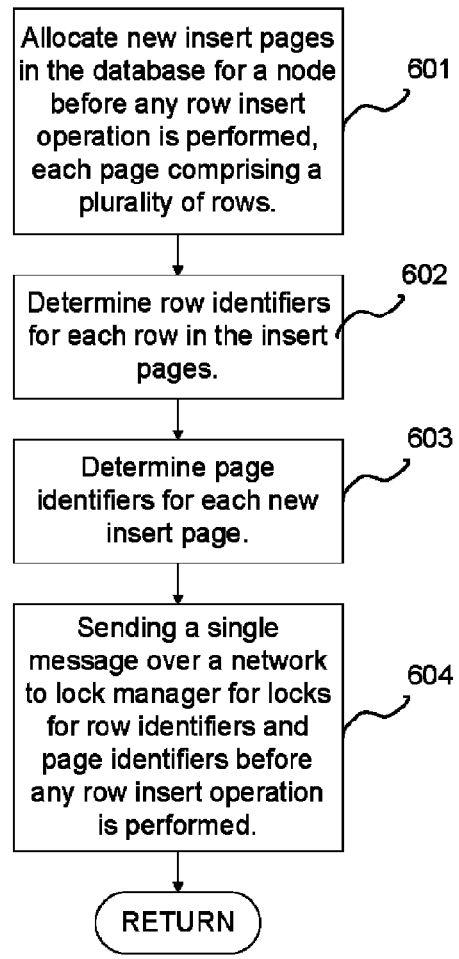
FIG. 6 is a flowchart illustrating an embodiment of the method for combining lock requests into a single message for new insert pages.

With the method of the present invention, the lock requests for the rows and pages in the new insert pages are combined into a single message prior to any actual insertion of a row. FIG. 6 is a flowchart illustrating an embodiment of the method for combining lock requests into a single message for new insert pages. New insert pages in the database 107 are allocated for a node before any row insert operation is performed, each page comprising a plurality of rows (601). This allocation process is leveraged by pre-fetching the row locks and page locks for the new insert pages. The row identifiers for each row in the insert pages are determined (602). The page identifiers for each new insert page are determined from the row identifiers (603). A single request is then sent over the network to the lock manager 108 for locks for the row identifiers and page identifiers before any insert operation is performed (604). When a row insert operation is actually performed into one of the insert pages, the row and page locks need not be requested again, thus saving on lock request messages.

In this embodiment, the pre-fetched locks are kept in memory local to the host computer 102 requesting the locks. To avoid memory usage problems, a clean-up algorithm may be used where the locks in memory are released if no row has been inserted within a certain period of time.

Early Acquiring of Locks through Double Execution of Operation

In another embodiment of the method of the present invention, the number of lock requests is reduced by performing a row modification operation in two executions rather than one. In the first execution, the row modification is not actually performed and no locks are acquired. Instead, the first execution determines what locks will likely be needed for the operation. In the second execution, the row modification is performed and the locks acquired.

Figure 7:
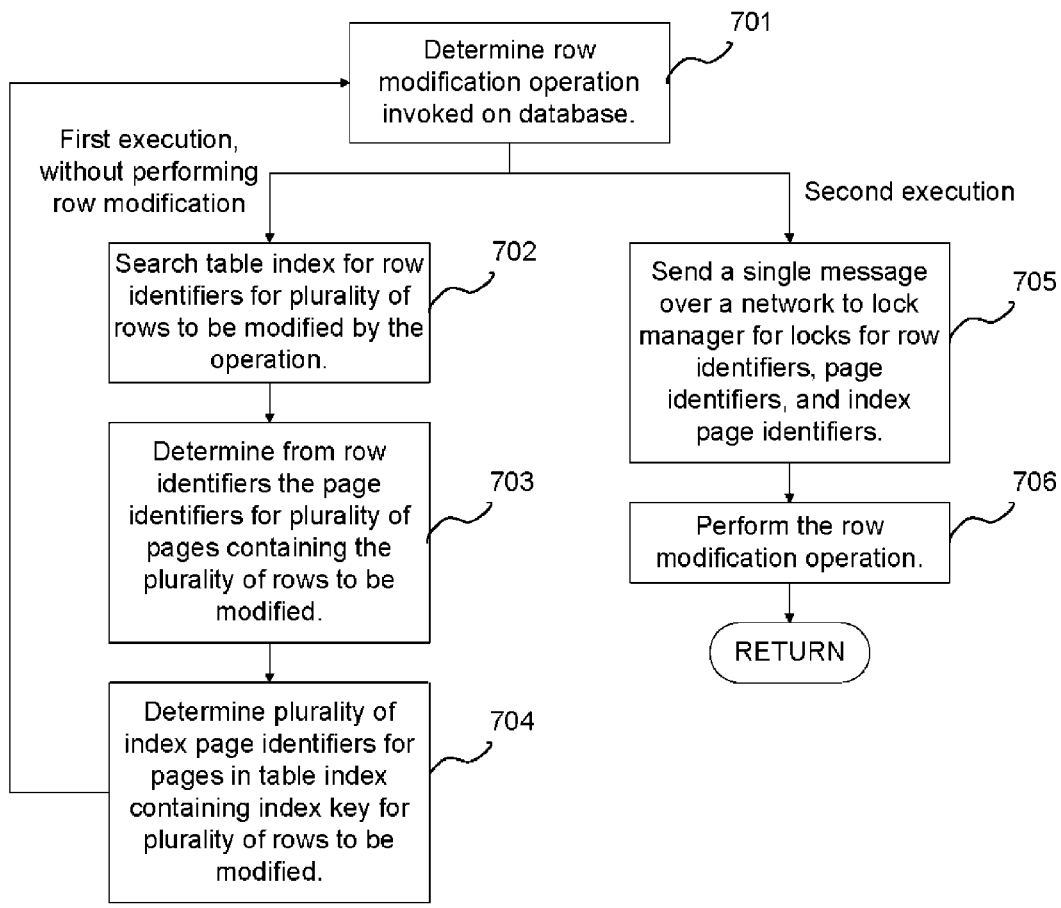
FIG. 7 is a flowchart illustrating an embodiment of the method for early acquisition of locks through double execution of an operation.

FIG. 7 is a flowchart illustrating an embodiment of the method for early acquisition of locks through double execution of an operation. A row modification operation is determined to be invoked on the database 107 (701). On the first execution, without performing the actual row modification, an index table is searched for row identifiers for a plurality of rows to be modified by the operation (702). From the row identifiers, the page identifiers for the plurality of pages containing the plurality of rows to be modified are determined (703). The plurality of index page identifiers for the pages in the index table containing the index key for the plurality of rows to be modified are also determined (704). On the second execution, a single request is sent over the network to the lock manager 108 for the locks for the row identifiers, page identifiers, and index page identifiers (705). The row modification operation is then performed (706).

By performing the first execution prior to the actual performance of the row modification, all locks likely required for the operation can be identified, and the requests for these locks can then be combined into a single message. Although the operation is performed in two executions, thus requiring more resources than if the operation was performed in one execution, the cost savings in the reduction of messages to the lock manager 108 outweighs this additional resource consumption.

Another embodiment of the method for early acquisition of locks concerns free space searching. In free space searching, empty spaces in pages into which a row can be inserted are found prior to the actual insertion of the row. With the method of the present invention, this searching process is leveraged by pre-fetching the locks for the pages and rows containing the empty spaces. FIG. 8 is a flowchart illustrating an embodiment of the method for early acquisition of locks in free space searching. A row insert operation is determined to be invoked on the database 107 (801). A plurality of empty spaces in one or more tables in the database 107 into which the row may be inserted are determined (802). The row identifiers for rows in the empty spaces are determined (803). From the row identifiers, the page identifiers for the pages containing the plurality of potential empty spaces are determined (804). A single request is then sent over the network to the lock manager 108 for locks for the row identifiers and the page identifiers (805). The row insert operation is then performed without sending a request to the lock manager 108 for locks for the row identifier and the page identifier corresponding to the slot into which the row is inserted (806). Although in this embodiment more locks are acquired than are actually necessary for the row insert operation, and these locks must be kept in memory, the savings in messages to the lock manager 108 outweighs this additional resource consumption.

Unfair Locking

In another embodiment of the method of the present invention, the number of lock requests is reduced by the lock manager not granting locks on a strictly fair manner. For example, assume that User 1 and User 2 are coupled to Host Computer A. Assume also that User 3 is coupled to Host Computer B. User 1, User 2, and User 3 each sends a message requesting the same lock. The order in which the lock is requested is {User 1, User 3, User 2}. When locks are granted in a strictly fair manner, the lock manager 108 grants the lock sequentially, based on the order the lock requests are made. Thus, the lock is first granted to User 1 at Host Computer A, then granted to User 3 at Host Computer B, then granted to User 2 at Host Computer A. In a strictly fair approach, three messages are sent to the lock manager 108.

In an unfair locking approach, lock requests are granted in an order based on the host computer from which the users send their lock requests. FIG. 9 is a flowchart illustrating an embodiment of a method for reducing lock traffic by granting locks in an unfair manner. A first host computer sends a single message over the network to the lock manager 108 for a lock required by users operatively coupled to the first host computer 102 (901). A second host computer sends a single message over the network to the lock manager 108 for the same lock required by one or more users operatively coupled to the second host computer (902). The lock is granted to the first host computer by the lock manager 108 (903). The first host computer then grants ownership of the lock to each of the users operatively coupled to the first host computer who requested the lock, before releasing the lock (905). After the first host computer releases the lock (905), the lock is granted to the second host by the lock manager 108 (906).

Applying the unfair locking approach with the example above, Host Computer A sends a single message over the network to the lock manager 108 for a lock requested by User 1 and User 2 (901). Host Computer B sends a single message over the network to the lock manager 108 for the same lock requested by User 3 (902). The lock is granted to Host Computer A (903). Host Computer A grants ownership of the lock to User 1 and then to User 2 before releasing the lock (904). After the lock is released by Host Computer A (905), the lock is granted to Host Computer B (906). In this example, messages to the lock manager 108 are reduced by one.

Consider an example in which a lock has a large number of users, both coupled to Host Computer A and Host Computer B. If Host Computer A is always allowed to maintain ownership of the lock until ownership has been granted to all of its users who requested the lock, the users at Host Computer B may be starved. To avoid this situation, the method can continue to grant the lock to Host Computer A for a fixed number of requests or users, or for a fixed time period, before requiring Host Computer A to release the lock.

What is claimed is:

1. A method for reducing lock communications in a shared disk database system, comprising:
   determining an operation to modify data on the database system is invoked, the operation requiring multiple locks;
   determining which locks to pre-fetch by determining one or more locks required for the operation and one or more locks that will be required in the future wherein the operation is performed on a row, and wherein the locks are determined without performing the operation on the row; and
   sending a single message over a network to a lock manager of the database system, the single message requesting the locks required for the operation and the locks that will be required in the future, wherein the one or more locks are pre-fetched as a result of the single message, and wherein a number of lock requests is reduced by pre-fetching the locks.

2. The method of claim 1, wherein the operation comprises a row update operation, wherein the determining the locks required for the operation and the locks that will be required in the future comprises:
   determining a row identifier for each row to be updated, and
   for each row identifier, determining from the row identifier a page identifier for a page containing the row to be updated, and
   wherein the sending the single message over the network to the lock manager of the database system for the locks required for the operation and the locks that will be required in the future comprises:
   sending the single message over the network to the lock manager of the database system for a lock for each row identifier and a page lock for each page identifier.

3. The method of claim 1, wherein the operation comprises a row delete operation, wherein the determining the locks required for the operation and the locks that will be required in the future comprises:
   searching a table index for a row identifier for each row to be deleted,
   for each row identifier, determining from the row identifier a page identifier for a page containing the row to be deleted, and
   determining an index page identifier for each page in the table index containing an index key for the row to be deleted, and
   wherein the sending the single message over the network to the lock manager of the database system for the locks required for the operation and the locks that will be required in the future comprises:
   sending the single message over the network to the lock manager of the database system for locks for each row identifier, each page identifier, and each index page identifier.

4. The method of claim 1, wherein the operation comprises a row modification operation, wherein the determining the locks required for the operation and the locks that will be required in the future comprises:
   determining that a scan of a plurality of rows is required for the operation, and
   determining a plurality of row identifiers for the plurality of rows to be scanned, and
   wherein the sending the single message over the network to the lock manager of the database system for the locks required for the operation and the locks that will be required in the future comprises:
   sending the single message over the network to the lock manager of the database system for a plurality of locks for the plurality of row identifiers.

5. The method of claim 1, wherein the determining the operation to modify data on the database system is invoked, the operation requiring multiple locks, comprises:
   allocating one or more new insert pages for a node of the database system before any row insert operation is performed, each new insert page comprising a plurality of rows,
   wherein the determining the locks required for the operation and the locks that will be required in the future comprises:
   determining a plurality of row identifiers for the plurality of rows in the new insert pages, and
   determining from the row identifier a plurality of page identifiers for the new insert pages, and
   wherein the sending the single message over the network to the lock manager of the database system for the locks required for the operation and the locks that will be required in the future comprises:
   sending the single message over the network to the lock manager of the database system for locks for the plurality of row identifiers and the plurality of page identifiers before any row insert operation is performed on the new insert pages.

6. The method of claim 1, wherein the operation comprises a row modification,
   wherein the determining one or more locks required for the operation and one or more locks that will be required in the future comprises:
   in a first execution of the row modification operation, determining locks required for the row modification operation without performing the row modification, the first execution comprising:
   searching a table index for one or more row identifiers for one or more rows to be modified by the row modification operation,
   determining from the row identifiers one or more page identifiers for one or more pages containing the rows to be modified by the row modification operation, and
   determining one or more index page identifiers for one or more pages in the table index containing an index key for the rows to be modified by the row modification operation,
   wherein the sending a single message over the network to the lock manager of the database system for the locks required for the operation and the locks that will be required in the future comprises:

in a second execution of the row modification operation, sending a single message over a network to a lock manager of the database system for locks for the row identifiers, the page identifiers, and the index page identifiers, and performing the row modification.

7. The method of claim 1, wherein the operation comprises a row insert operation, wherein the determining one or more locks required for the operation and one or more locks that will be required in the future comprises:

determining a plurality of empty spaces in one or more tables of the database system into which a row may be inserted;

determining a plurality of row identifiers for a plurality of rows in the empty spaces; and determining from the plurality of row identifiers one or more page identifiers for one or more pages containing the plurality of empty spaces, wherein the sending the single message over the network to the lock manager of the database system for the locks required for the operation and the locks that will be required in the future comprises:

sending a single message over a network to a lock manager of the database system for locks for the plurality of row identifiers and the plurality of page identifiers; and performing the row insert operation without sending a new request to the lock manager for the locks for the plurality of row identifiers, the plurality of page identifiers corresponding to a slot in the empty spaces into which the row is inserted.

8. A computer program product for reducing lock communications in a shared disk database system, comprising:

a computer readable storage medium having computer readable program code embodied therewith, the computer readable program code comprising computer readable program code configured to:

determine an operation to modify data on the database system is invoked, the operation requiring multiple locks;

determine which locks to pre-fetch by determining one or more locks required for the operation and one or more locks that will be required in the future wherein the operation is performed on a row, and wherein the locks are determined without performing the operation on the row; and send a single message over a network to a lock manager of the database system, the single message requesting the locks required for the operation and the locks that will be required in the future, wherein the one or more locks are pre-fetched as a result of the single message, and wherein a number of lock requests is reduced by pre-fetching the locks.

9. The product of claim 8, wherein the operation comprises a row update operation, wherein the computer program code configured to determine the locks required for the operation and the locks that will be required in the future is further configured to:

determine a row identifier for each row to be updated, and for each row identifier, determine from the row identifier a page identifier for a page containing the row to be updated, and wherein the computer program code configured to send the single message over the network to the lock manager of the database system for the locks required for the operation and the locks that will be required in the future is further configured to:

send the single message over the network to the lock manager of the database system for a lock for each row identifier and a page lock for each page identifier.

10. The product of claim 8, wherein the operation comprises a row delete operation, wherein the computer program code configured to determine the locks required for the operation and the locks that will be required in the future is further configured to:

search a table index for a row identifier for each row to be deleted, for each row identifier, determine from the row identifier a page identifier for a page containing the row to be deleted, and determine an index page identifier for each page in the table index containing an index key for the row to be deleted, and wherein the computer program code configured to send the single message over the network to the lock manager of the database system for the locks required for the operation and the locks that will be required in the future is further configured to:

send the single message over the network to the lock manager of the database system for locks for each row identifier, each page identifier, and each index page identifier.

11. The product of claim 8, wherein the operation comprises a row modification operation, wherein the computer program code configured to determine the locks required for the operation and the locks that will be required in the future is further configured to:

determine that a scan of a plurality of rows is required for the operation, and determine a plurality of row identifiers for the plurality of rows to be scanned, and wherein the computer program code configured to send the single message over the network to the lock manager of the database system for the locks required for the operation and the locks that will be required in the future is further configured to:

send the single message over the network to the lock manager of the database system for a plurality of locks for the plurality of row identifiers.

12. The product of claim 8, wherein the computer program code configured to determine the operation to modify data on the database system is invoked, the operation requiring multiple locks, is further configured to:

allocate one or more new insert pages for a node of the database system before any row insert operation is performed, each new insert page comprising a plurality of rows, wherein the computer program code configured to determine the locks required for the operation and the locks that will be required in the future is further configured to:

determine a plurality of row identifiers for the plurality of rows in the new insert pages, and determine from the row identifier a plurality of page identifiers for the new insert pages, and wherein the computer program code configured to send the single message over the network to the lock manager of the database system for the locks required for the operation and the locks that will be required in the future is further configured to:

send the single message over the network to the lock manager of the database system for locks for the plurality of row identifiers and the plurality of page identifiers before any row insert operation is performed on the new insert pages.

13. The product of claim 8, wherein the operation comprises a row modification,
wherein the computer program code configured to determine one or more locks required for the operation and one or more locks that will be required in the future is further configure to:
in a first execution of the row modification operation, determine locks required for the row modification operation without performing the row modification, the first execution configured to:
search a table index for one or more row identifiers for one or more rows to be modified by the row modification operation,
determine from the row identifiers one or more page identifiers for one or more pages containing the rows to be modified by the row modification operation, and
determine one or more index page identifiers for one or more pages in the table index containing an index key for the rows to be modified by the row modification operation,
wherein the computer program code configured to send the single message over the network to the lock manager of the database system for the locks required for the operation and the locks that will be required in the future is further configured to:
in a second execution of the row modification operation, send a single message over a network to a lock manager of the database system for locks for the row identifiers, the page identifiers, and the index page identifiers, and
perform the row modification.

14. The product of claim 8, wherein the operation comprises a row insert operation, wherein the computer program code configured to determine one or more locks required for the operation and one or more locks that will be required in the future is further configured to:
determine a plurality of empty spaces in one or more tables of the database system into which a row may be inserted;
determine a plurality of row identifiers for a plurality of rows in the empty spaces; and
determine from the plurality of row identifiers one or more page identifiers for one or more pages containing the plurality of empty spaces,
wherein the computer program code configured to send the single message over the network to the lock manager of the database system for the locks required for the operation and the locks that will be required in the future is further configured to:
send a single message over a network to a lock manager of the database system for locks for the plurality of row identifiers and the plurality of page identifiers; and
perform the row insert operation without sending a new request to the lock manager for the locks for the plurality of row identifiers, the plurality of page identifiers corresponding to a slot in the empty spaces into which the row is inserted.

15. A system, comprising:
a database system;
a lock manager of the database system; and
a computer comprising a computer readable storage medium having computer readable program code embodied therewith, the computer readable program code configured to:
determine an operation to modify data on the database system is invoked, the operation requiring multiple locks,
determine which locks to pre-fetch by determining one or more locks required for the operation and one or more locks that will be required in the future wherein the operation is performed on a row, and wherein the locks are determined without performing the operation on the row, and
send a single message over a network to the lock manager of the database system, the single message requesting the locks required for the operation and the locks that will be required in the future, wherein the one or more locks are pre-fetched as a result of the single message, and wherein a number of lock requests is reduced by pre-fetching the locks.

16. The system of claim 15, wherein the operation comprises a row update operation, wherein the computer readable program code configured to determine the locks required for the operation and the locks that will be required in the future is further configured to:
determine a row identifier for each row to be updated, and
for each row identifier, determine from the row identifier a page identifier for a page containing the row to be updated, and
wherein the computer readable program code configured to send the single message over the network to the lock manager of the database system for the locks required for the operation and the locks that will be required in the future is further configured to:
send the single message over the network to the lock manager of the database system for a lock for each row identifier and a page lock for each page identifier.

17. The system of claim 15, wherein the operation comprises a row delete operation, wherein the computer readable program code configured to determine the locks required for the operation and the locks that will be required in the future is further configured to:
search a table index for a row identifier for each row to be deleted,
for each row identifier, determine from the row identifier a page identifier for a page containing the row to be deleted, and
determine an index page identifier for each page in the table index containing an index key for the row to be deleted, and
wherein the computer readable program code configured to send the single message over the network to the lock manager of the database system for the locks required for the operation and the locks that will be required in the future is further configured to:
send the single message over the network to the lock manager of the database system for locks for each row identifier, each page identifier, and each index page identifier.

18. The system of claim 15, wherein the operation comprises a row modification operation, wherein the computer readable program code configured to determine the locks required for the operation and the locks that will be required in the future is further configured to:
determine that a scan of a plurality of rows is required for the operation, and
determine a plurality of row identifiers for the plurality of rows to be scanned, and
wherein the computer readable program code configured to send the single message over the network to the lock manager of the database system for the locks required for the operation and the locks that will be required in the future is further configured to:

send the single message over the network to the lock manager of the database system for a plurality of locks for the plurality of row identifiers.

19. The system of claim 15, wherein the computer readable program code configured to determine an operation to modify data on the database system is invoked, the operation requiring multiple locks, is further configured to:
allocate one or more new insert pages for a node of the database system before any row insert operation is performed, each new insert page comprising a plurality of rows,
wherein the computer readable program code configured to determine the locks required for the operation and the locks that will be required in the future is further configured to:
determine a plurality of row identifiers for the plurality of rows in the new insert pages, and
determine from the row identifier a plurality of page identifiers for the new insert pages, and
wherein the computer readable program code configured to send the single message over the network to the lock manager of the database system for the locks required for the operation and the locks that will be required in the future is further configured to:
send the single message over the network to the lock manager of the database system for locks for the plurality of row identifiers and the plurality of page identifiers before any row insert operation is performed on the new insert pages.

20. The system of claim 15, wherein the operation comprises a row modification,
wherein the computer readable program code configured to determine one or more locks required for the operation and one or more locks that will be required in the future is further configured to:
in a first execution of the row modification operation, determine locks required for the row modification operation without performing the row modification, the first execution is configured to:
search a table index for one or more row identifiers for one or more rows to be modified by the row modification operation,
determine from the row identifiers one or more page identifiers for one or more pages containing the rows to be modified by the row modification operation, and
determine one or more index page identifiers for one or more pages in the table index containing an index key for the rows to be modified by the row modification operation,
wherein the computer readable program code configured to send a single message over the network to the lock manager of the database system for the locks required for the operation and the locks that will be required in the future is configured to:
in a second execution of the row modification operation, send a single message over a network to a lock manager of the database system for locks for the row identifiers, the page identifiers, and the index page identifiers, and
perform the row modification.

21. The system of claim 15, wherein the operation comprises a row insert operation,
wherein the computer readable program code configured to determine one or more locks required for the operation and one or more locks that will be required in the future is further configured to:

determine a plurality of empty spaces in one or more tables of the database system into which a row may be inserted;
determine a plurality of row identifiers for a plurality of rows in the empty spaces; and
determine from the plurality of row identifiers one or more page identifiers for one or more pages containing the plurality of empty spaces,
wherein the computer readable program code configured to send the single message over the network to the lock manager of the database system for the locks required for the operation and the locks that will be required in the future is further configured to:
send a single message over a network to a lock manager of the database system for locks for the plurality of row identifiers and the plurality of page identifiers; and
perform the row insert operation without sending a new request to the lock manager for the locks for the plurality of row identifiers, the plurality of page identifiers corresponding to a slot in the empty spaces into which the row is inserted.

22. A method for reducing lock communications in a shared disk database system, the shared disk database system comprising a first host computer and a second host computer, comprising:
identifying a plurality of lock requests for a lock from:
  i) a plurality of users operatively coupled to the first host computer, and
  ii) one or more users operatively coupled to the second host computer, wherein each of the plurality of lock requests is identified in a sequential order so that the plurality of lock requests may be granted in a fair manner according to the sequential order;
sending by the first host computer a single message to a lock manager for the database system for the lock requested by the plurality of users operatively coupled to the first host computer;
sending by the second host computer a single message to the lock manager for the database system for the lock requested by the one or more users operatively coupled to the second host computer;
receiving by the first host computer a grant of ownership of the lock, the ownership of the lock granted in an unfair manner, without regard to the sequential order in which each of the plurality of lock requests is identified, to reduce lock request messages sent to request locks;
granting by the first host computer ownership of the lock to the plurality of users operatively coupled to the first host computer, before releasing the lock;
releasing the lock by the first host computer; and
receiving by the second host computer the grant of the ownership of the lock.

23. The method of claim 22, wherein the receiving by the first host computer the grant of ownership of the lock comprises:
receiving by the first host computer the grant of ownership of the lock for a pre-determined number of user requests.

24. The method of claim 22, wherein the receiving by the first host computer the grant of ownership of the lock comprises:
receiving by the first host computer the grant of ownership of the lock, where ownership is granted for a pre-determined period of time.

25. The method of claim 22, further comprising:
granting by the second host computer the grant of the ownership of the lock to the one or more users operatively coupled to the second host computer.

* * * * *